(12) United States Patent
Yamaguchi et al.

(10) Patent No.: US 10,958,064 B2
(45) Date of Patent: Mar. 23, 2021

(54) SURGE VOLTAGE REDUCING MEMBER WITH REDUCED SIZE

(71) Applicant: Yazaki Corporation, Tokyo (JP)

(72) Inventors: Yasuhiro Yamaguchi, Kakegawa (JP); Hayato Iizuka, Kakegawa (JP); Takeshi Innan, Kakegawa (JP); Hiroshi Aihara, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 324 days.

(21) Appl. No.: 16/035,905

(22) Filed: Jul. 16, 2018

(65) Prior Publication Data
US 2019/0044320 A1 Feb. 7, 2019

(30) Foreign Application Priority Data
Aug. 4, 2017 (JP) .............................. JP2017-151481

(51) Int. Cl.
| H02H 3/20 | (2006.01) |
| H02H 9/04 | (2006.01) |
| H01F 27/24 | (2006.01) |
| H01F 27/28 | (2006.01) |
| H01F 27/00 | (2006.01) |
| H01F 17/06 | (2006.01) |

(52) U.S. Cl.
CPC ............... *H02H 3/20* (2013.01); *H01F 17/06* (2013.01); *H01F 27/00* (2013.01); *H01F 27/24* (2013.01); *H01F 27/28* (2013.01); *H02H 9/04* (2013.01); *H02H 9/044* (2013.01)

(58) Field of Classification Search
CPC . H02H 3/20; H02H 9/04; H02H 9/044; H01F 17/06; H01B 9/006; H01B 9/028; H01R 9/15; B60R 16/02
USPC ............................................................ 361/56
See application file for complete search history.

(56) References Cited

U.S. PATENT DOCUMENTS

| 3,484,074 A | * | 12/1969 | Kitchener ............. F16K 31/082 251/65 |
| 10,224,388 B2 | * | 3/2019 | Okada .................... H01F 17/062 |
| 2015/0096802 A1 | * | 4/2015 | Itani .................... B60R 16/0215 174/72 A |
| 2016/0362074 A1 | * | 12/2016 | Yamaguchi .............. H02H 9/06 |
| 2017/0174152 A1 | * | 6/2017 | Yamaguchi .......... H01B 7/0045 |

FOREIGN PATENT DOCUMENTS

| CN | 205282241 U | 6/2016 |
| FR | 2510811 A1 | 2/1983 |
| JP | 59161803 A | 9/1984 |
| JP | 62133812 A | 6/1987 |
| JP | 01236711 A | 9/1989 |
| JP | 2012099739 A | 5/2012 |
| JP | 2012-174661 A | 9/2012 |

* cited by examiner

*Primary Examiner* — Yemane Mehari
(74) *Attorney, Agent, or Firm* — Sughrue Mion, PLLC

(57) ABSTRACT

A surge voltage reducing member includes: a magnetic body including a long-side portion and short-side portions continuously formed at both ends of the long-side portion in a longitudinal direction; and a plurality of conductive paths wound around the long-side portion. Each of the conductive paths is wound in parallel along the longitudinal direction of the long-side portion.

7 Claims, 10 Drawing Sheets

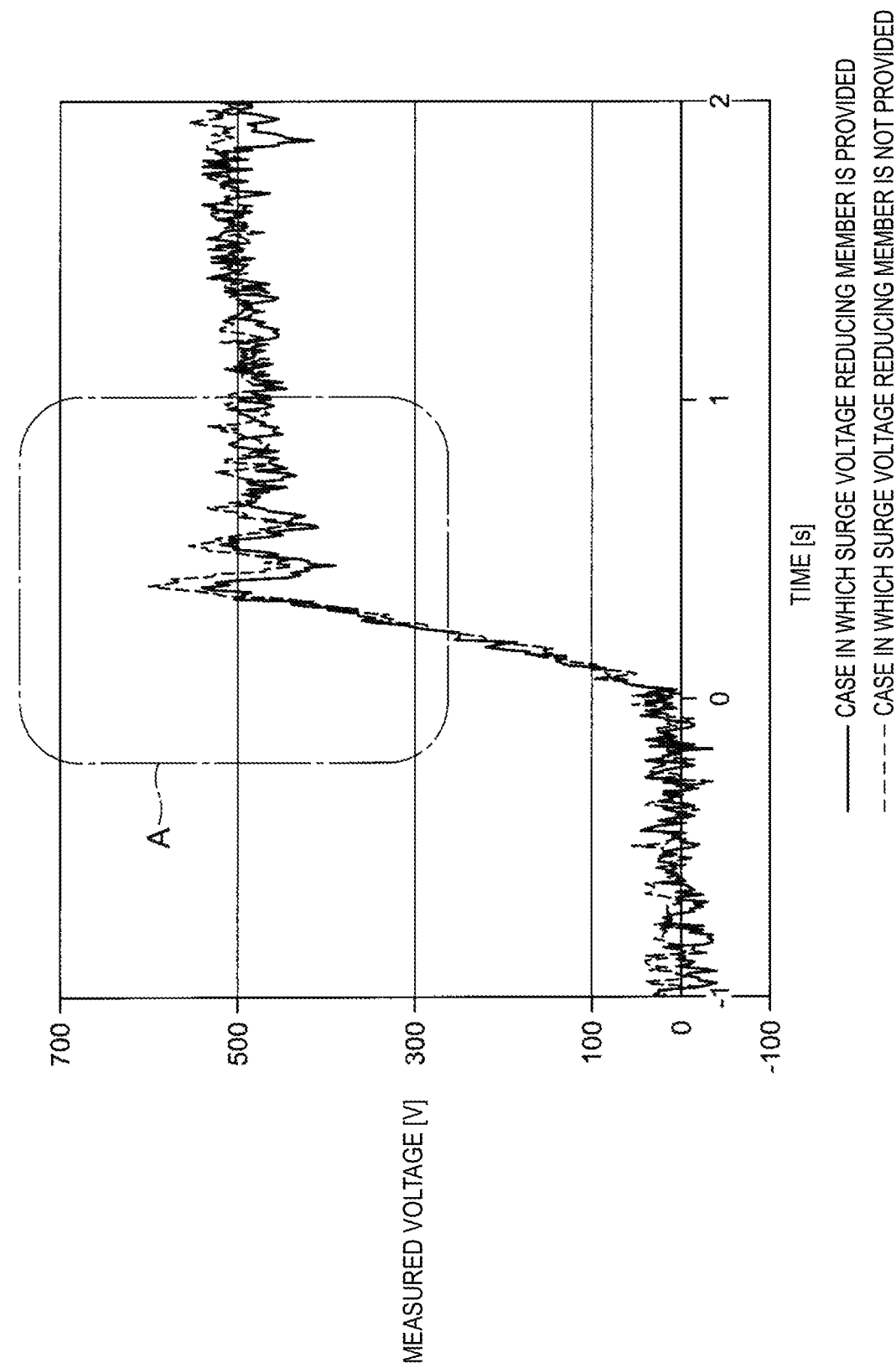

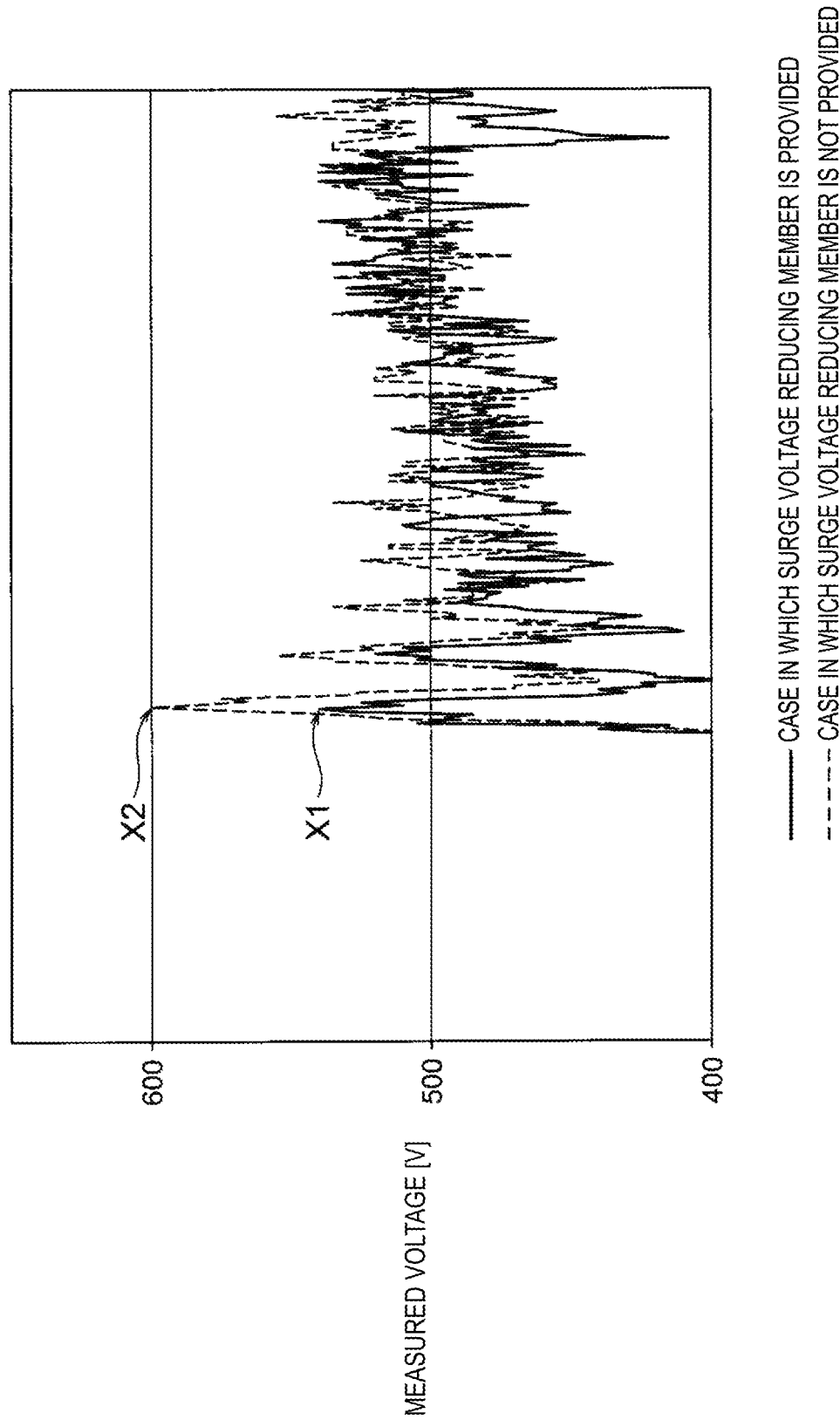

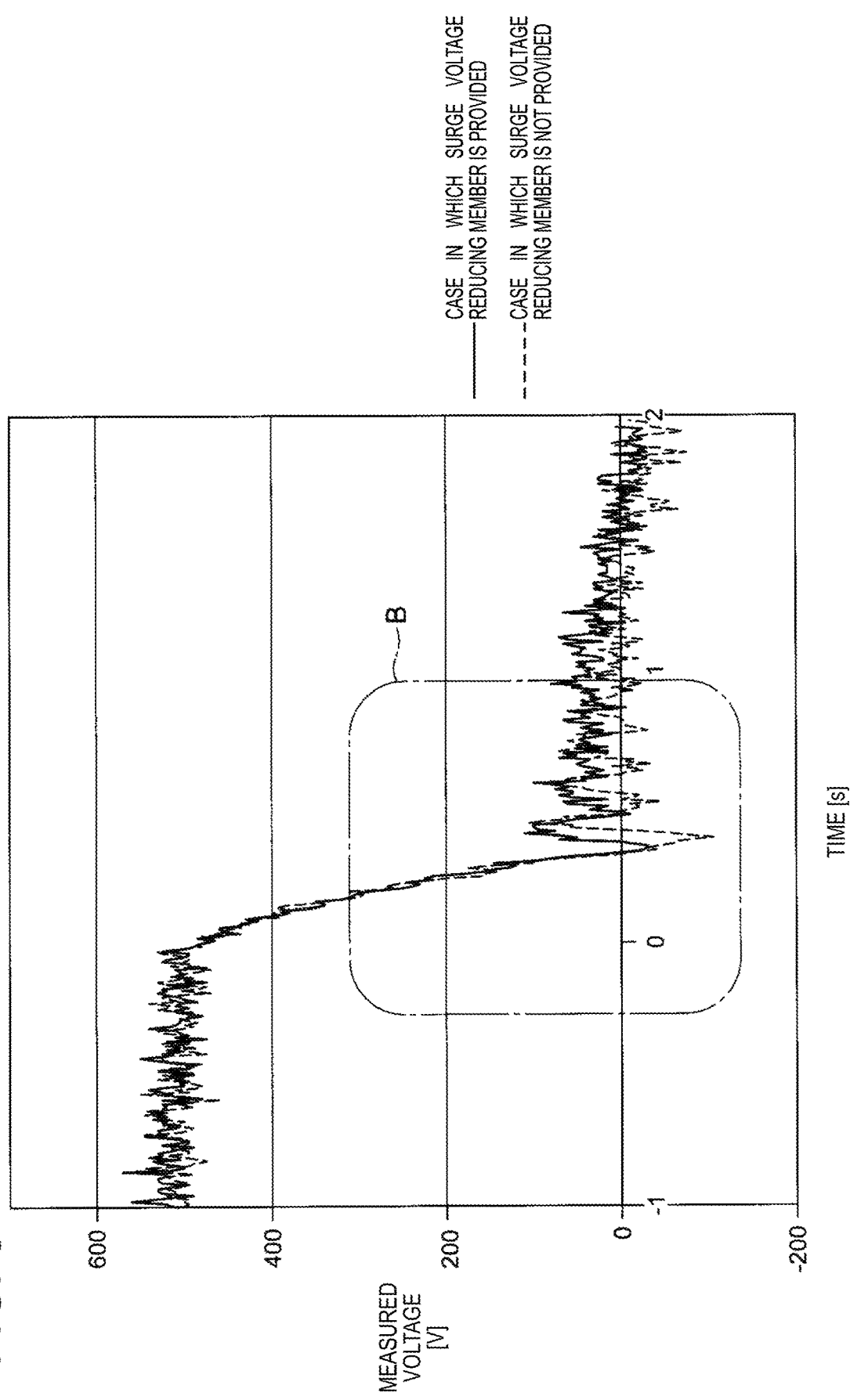

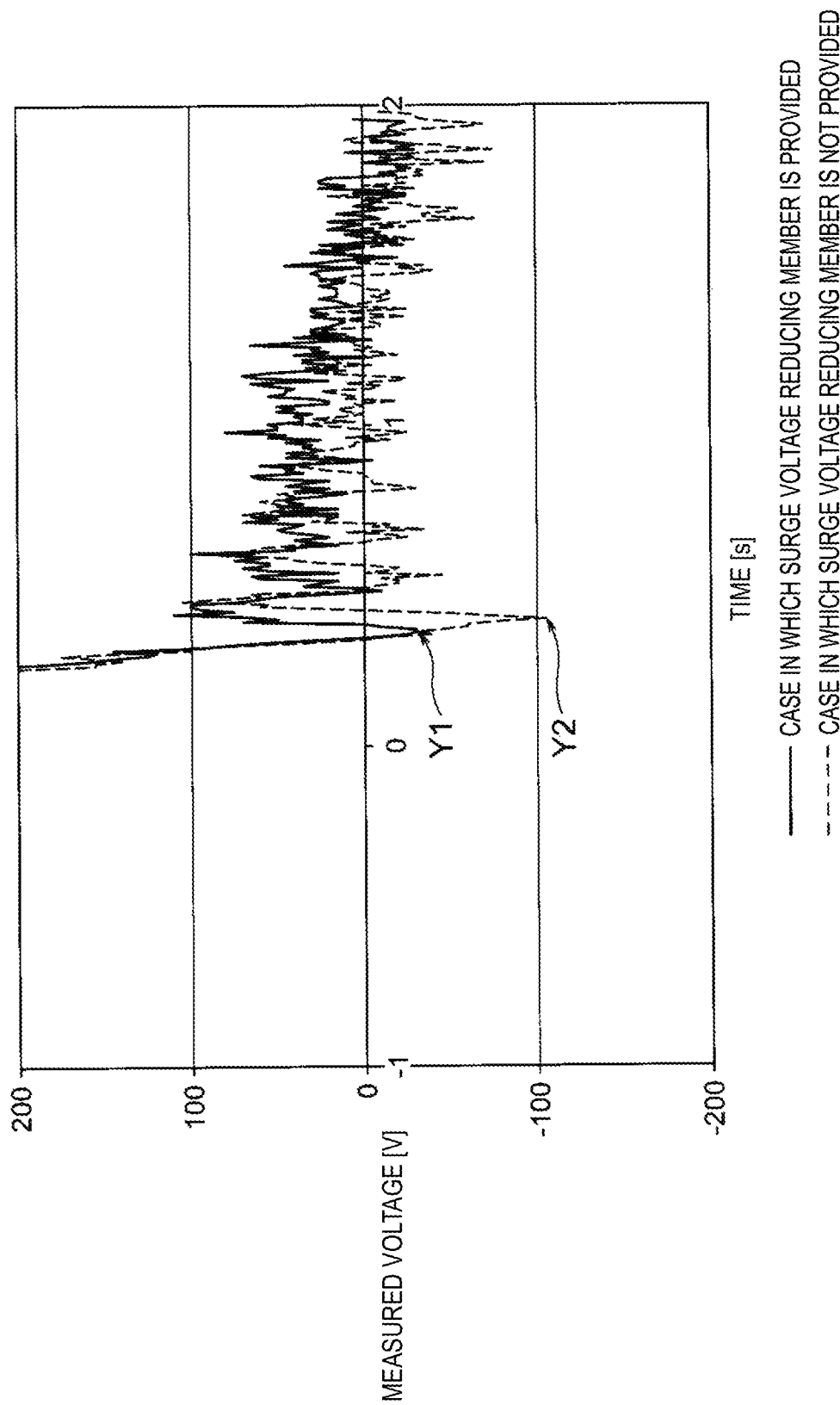

SURGE VOLTAGE REDUCING MEMBER WITH REDUCED SIZE

CROSS-REFERENCES TO RELATED APPLICATIONS

This application is based on and claims priority from Japanese Patent Application No. 2017-151481 filed on Aug. 4, 2017, the entire contents of which are incorporated herein by reference.

FIELD

One or more embodiments of the present invention relate to a surge voltage reducing member for reducing a surge voltage.

BACKGROUND

As a related art, a surge voltage reducing member for reducing a surge voltage, for example, a technology disclosed in JP-A-2012-174661 is well-known.

The connector device illustrated in FIG. 6 of JP-A-2012-174661 is mounted on an electric vehicle. The connector device includes two toroidal cores. The toroidal cores are made of a magnetic material and are provided in an annular shape. The power supply AC wires extending from the tubular portion of the connector device are wound around the respective toroidal cores and connected to a charger (not illustrated) mounted on the electric vehicle. The grounding wire extending from the tubular portion extends through the two toroidal cores.

SUMMARY

However, the technology of the related art has a problem of increasing the size of a product caused by the construction in which the power supply AC wires are wound around the annular toroidal cores.

One or more embodiments of the present invention have been made in view of the above circumstances, and an object thereof is to provide a surge voltage reducing member having a compact size.

In an aspect of the present invention, there is provided a surge voltage reducing member including: a magnetic body including a long-side portion and short-side portions continuously formed at both ends of the long-side portion in a longitudinal direction; and a plurality of conductive paths wound around the long-side portion, wherein each of the conductive paths is wound in parallel along the longitudinal direction of the long-side portion.

With this configuration, since the plurality of conductive paths are wound around the long-side portion of the magnetic body so as to be arranged side by side in the longitudinal direction of the magnetic body, it is possible to reduce the height and width of the magnetic body in comparison with the related art in which the plurality of conductive paths are wound around a magnetic body having a toroidal shape.

In the surge voltage reducing member, the magnetic body may be positioned such that the longitudinal direction of the long-side portion is along an arrangement direction of the conductive paths.

With this configuration, since the magnetic body is arranged such that the longitudinal direction of the long-side portion thereof is the arrangement direction of the respective conductive paths, it is possible to reduce the height and width of the magnetic body in comparison with the construction of the related art in which conductive paths are wound around the annular magnetic bodies.

In the surge voltage reducing member, the short-side portion is configured to restrict movement of each of the conductive paths wound around the long-side portion in the longitudinal direction of the long-side portion.

With this configuration, when the conductive paths wound around the long-side portion are forced to shift in the longitudinal direction of the long-side portion, the shift of the conductive paths in the longitudinal direction of the magnetic body is limited due to the short-side portion. Therefore, it is possible to maintain a state in which the respective conductive paths are wound to be arranged side by side in the longitudinal direction of the long-side portion of the magnetic body.

According to one or more embodiments of the invention, it is possible to reduce the height and width of the magnetic body as compared with a structure of the related art in which the plurality of conductive paths are wound around annulus magnetic bodies. Therefore, one or more embodiments of the invention have an effect of reducing the size of a product body.

BRIEF DESCRIPTION OF DRAWINGS

FIGS. 2A to 2B are views illustrating a comparison between surge voltage reducing members, in which FIG. 2A illustrates the surge voltage reducing member according to the first embodiment, which is viewed in a direction (hereinafter, referred to as an arrangement direction of conductive paths) in which conductive paths are arranged, and FIG. 2B illustrates the surge voltage reducing member according to a comparative example, which is viewed in the arrangement direction of conductive paths;

FIG. 3 is a waveform diagram illustrating a rising edge of a surge voltage waveform for a case where the surge voltage reducing member is provided and a rising edge of a surge voltage waveform for a case where the surge voltage reducing member is not provided;

FIG. 4 is an enlarged waveform diagram of a portion surrounded by a chain line of FIG. 3;

FIG. 5 is a waveform diagram illustrating a falling edge of a surge voltage waveform for a case where the surge voltage reducing member is provided and a falling edge of a surge voltage waveform for a case where the surge voltage reducing member is not provided;

FIG. 6 is an enlarged waveform diagram of a portion surrounded by a chain line of FIG. 5;

DETAILED DESCRIPTION

Hereinafter, a surge voltage reducing member according to a first embodiment of the invention will be described with reference to FIGS. 1A to 7, a surge voltage reducing member according to a second embodiment of the invention will be described with reference to FIGS. 8A to 9B, and a surge voltage reducing member according to a third embodiment of the invention will be described with reference to FIGS. 10A and 10B.

First Embodiment

Figure 1A:
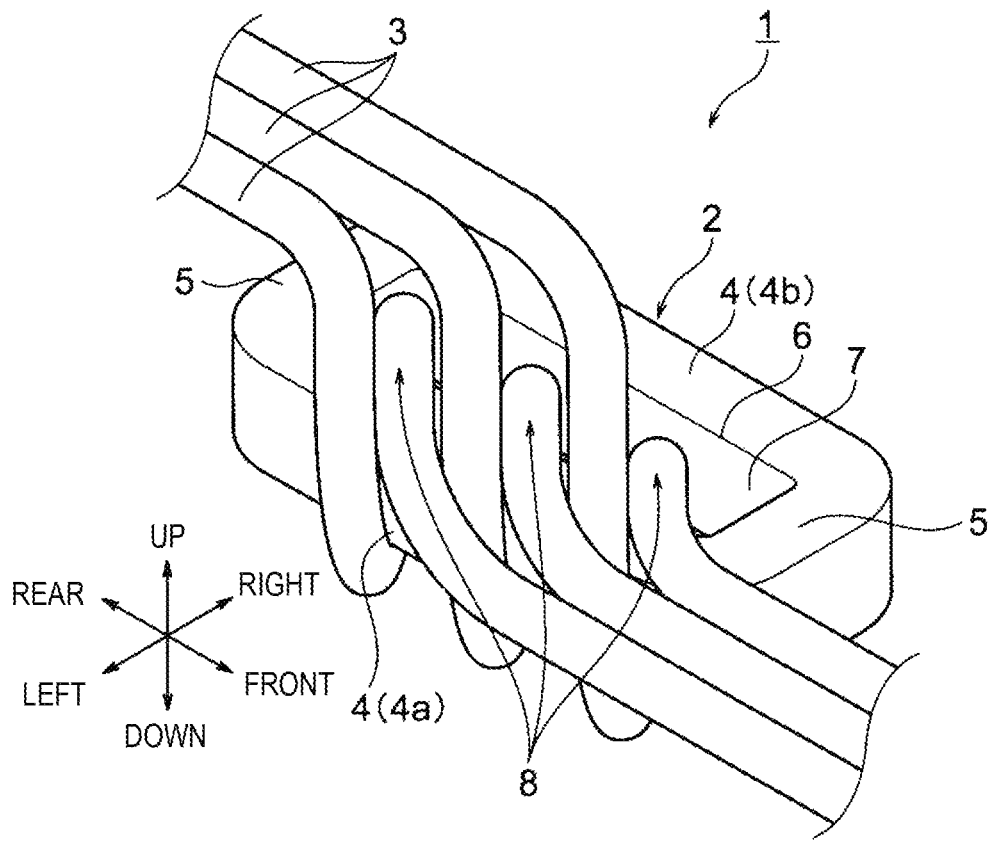
FIGS. 1A and 1B are a perspective view and a plan view, respectively, illustrating a serge voltage reducing member according to a first embodiment of the invention.
Figure 1B:
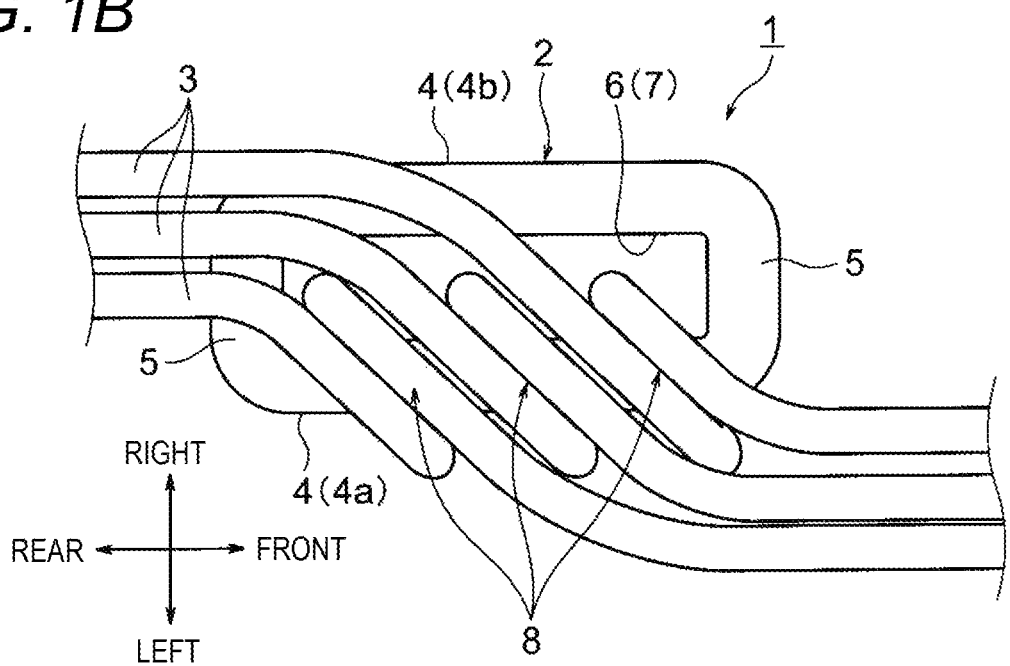
Figure 2A:
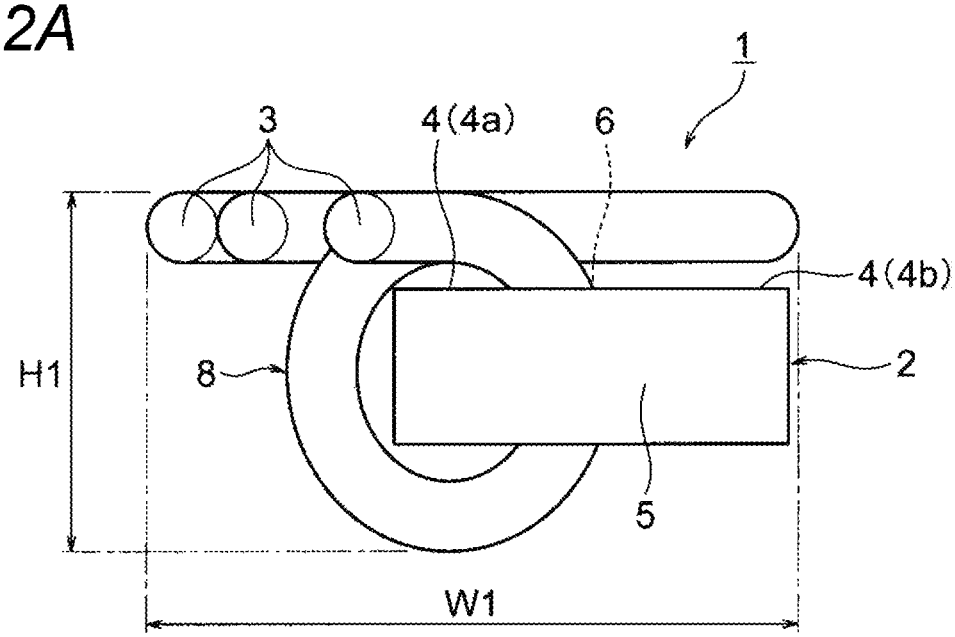
Figure 2B:
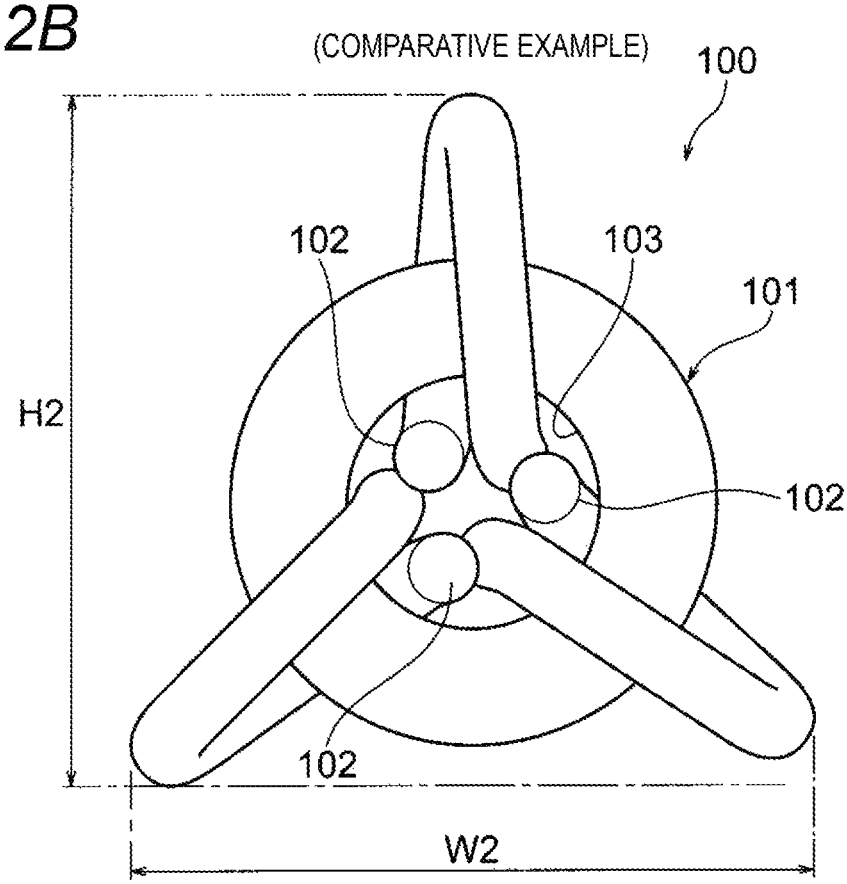
Figure 7:
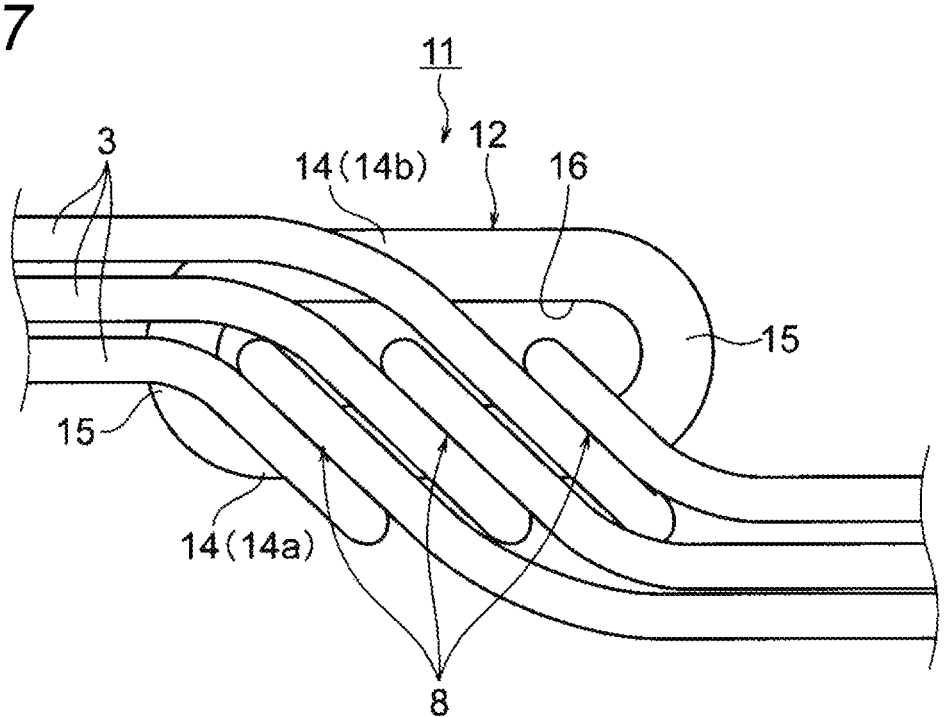
FIG. 7 is a plan view illustrating the surge voltage reducing member according to a modification to the first embodiment.

FIGS. 1A and 1B are a perspective view and a plan view, respectively, illustrating a serge voltage reducing member according to the first embodiment of the invention; FIGS. 2A and 2B are diagrams illustrating a comparison between the surge voltage reducing members, in which FIG. 2A illustrates the surge voltage reducing member according to the first embodiment, which is viewed in a direction (hereinafter, referred to as an arrangement direction of conductive paths) in which conductive paths are arranged, and FIG. 2B illustrates the surge voltage reducing member according to a comparative example, which is viewed in the arrangement direction of conductive paths; FIG. 3 is a waveform diagram illustrating a rising edge of a surge voltage waveform for a case where the surge voltage reducing member is provided and a rising edge of a surge voltage waveform for a case where the surge voltage reducing member is not provided; FIG. 4 is an enlarged waveform diagram of a portion surrounded by a chain line A of FIG. 3; FIG. 5 is a waveform diagram illustrating a falling edge of a surge voltage waveform for a case where the surge voltage reducing member is provided and a falling edge of a surge voltage waveform for a case where the surge voltage reducing member is not provided; FIG. 6 is an enlarged waveform diagram of a portion surrounded by a chain line B of FIG. 5; and FIG. 7 is a plan view illustrating the surge voltage reducing member according to a modification to the first embodiment. Here, arrows in the drawings indicates directions including an up-down direction, a left-right direction, and a front-rear direction, and the directions indicated by the arrows are only for illustrative purposes.

Referring to FIGS. 1A and 1B, a reference numeral 1 represents the surge voltage reducing member according to the first embodiment of the invention. The surge voltage reducing member 1 is configured to reduce a serge voltage by eliminating noise superimposed on a current flowing through a conductive path that connects to an inverter unit and a motor unit which are mounted on an electric vehicle or a hybrid vehicle, to deliver electric power from the inverter unit to the motor unit. However, the invention is not particularly limited thereto.

In addition, the invention also may be configured to reduce a surge voltage by eliminating noise superimposed on a current flowing through a conductive path that connects a battery (battery pack) and an inverter unit to deliver electric power from the battery to the inverter unit.

The surge voltage reducing member 1 illustrated in FIGS. 1A and 1B includes a magnetic body 2 and electric wires 3 (conductive path). Hereinafter, each component of the surge voltage reducing member 1 will be described below.

First, the magnetic body 2 will be described. The magnetic body 2 illustrated in FIGS. 1A and 1B is made of a magnetic material and formed in a cylindrical shape. As illustrated in FIG. 1B, the magnetic body 2 is formed so as to have a rectangular frame shape when viewed from its axial-direction (the direction from the front surface to the rear surface of the paper sheet, in FIG. 1B). The magnetic body 2 includes a long-side portion 4, a short-side portion 5, and a through hole 6.

The long-side portion 4 illustrated in FIGS. 1A and 1B includes a first long-side portion 4a around which the electric wires 3 may be wound, as described below, and a second long-side portion 4b around which the electric wires 3 may not be wound. In the embodiment, the magnetic body 2 is arranged such that the longitudinal direction of the long-side portion 4 is a direction (hereinafter, referred to as an arrangement direction of the turns of the electric wires 3) in which the turns of the electric wires 3 are arranged. In FIGS. 1A and 1B, the arrangement direction of the turns of the electric wires 3 corresponds to the front-rear direction.

The short-side portion 5 illustrated in FIGS. 1A and 1B is formed to extend from both ends of the long-side portion 4 in the longitudinal direction (the front-rear direction in FIGS. 1A and 1B). The short-side portion 5 is formed to restrict the movement of the electric wires 3 wound around the long-side portion 4a, the movement occurring in the longitudinal direction of the long-side portion 4a.

The through hole 6 illustrated in FIGS. 1A and 1B is formed to pass through the magnetic body 2 in the axial-direction the magnetic body 2 and is defined by the inner peripheral surfaces 7 of the magnetic body 2. The through hole 6 is formed to have a rectangular shape when viewed from the axial-direction of the magnetic body 2. The through hole 6 is formed such that the multiple electric wires 3 are wound around the long-side portion 4 while passing through the through hole 6, so that the turns of the electric wires are arranged side by side in the longitudinal direction of the long-side portion 4.

Although not specifically illustrated in the drawings, the through-hole 6 may be formed so that the width thereof in the short-side direction (the left-right direction in FIGS. 1A and 1B) is substantially equal to the diameter of the electric wires 3. By forming the through hole 6 in this manner, the space factor of the electric wires 3 with respect to the inner peripheral surface 7 of the magnetic body 2 can be improved, the size of the product can be reduced, and the surge voltage can be effectively reduced.

Next, the electric wires 3 will be described. The electric wires 3 illustrated in FIGS. 1A and 1B serves as an example of a "conductive path" recited in the claims. The electric wires 3 are a well-known high-voltage electric wire and include a conductor and an insulating coating for covering the conductor, although not illustrated in the drawings. In the embodiment, three electric wires 3 are used, but the invention is not limited thereto.

In this embodiment, electric wires are employed as the conductive paths, but the invention is not limited thereto. For example, a coil wire may be used as the conductive path. The coil wire may be a round wire having a circular cross-sectional shape when the coil wire is cut to be perpendicular to the axial-direction of the coil wire. Alternatively, the coil wire may be a flat wire having a rectangular cross-sectional shape when the coil wire is cut so as to be perpendicular to the axial-direction of the coil wire. When the flat coil wire is used, it is possible to further reduce the width of the through hole 6 in the short-side direction. In this case, the space factor of the electric wire 3 with respect to the inner circumferential surface 7 of the magnetic body 2 can be further improved, resulting in a further decrease in the physical size of the product. Therefore, the surge voltage can be more effectively reduced.

The electric wires 3 are inserted through the through hole 6 of the magnetic body 2 and wound around one long-side portion 4a of the magnetic body 2. In the present embodiment, the number of times the electric wires 3 are inserted to pass through the through hole 6 is one, but it may be two or more.

In the embodiment, a portion of the electric wires 3, which is wound around the long-side portion 4a, is referred to as a winding portion 8. In the embodiment, the winding portion 8 is formed by obliquely winding the electric wires with respect to the longitudinal direction of the long-side portion 4a.

The electric wires 3 are wound side by side in the longitudinal direction of one long-side portion 4a. That is, each winding portion 8 is arranged side by side along the longitudinal direction of one long-side portion 4a.

Next, a method of manufacturing (preparing) the surge voltage reducing member 1 will be described based on the above-described configuration and construction.

At a first step, a magnetic body 2 and three electric wires 3 are prepared. Next, the magnetic body 2 is disposed such that the longitudinal direction of a long-side portion 4 of the magnetic body 2 is parallel to the arrangement direction of the electric wires 3.

In a second step, each electric wires 3 is inserted through a through hole 6 of the magnetic body 2 and wound around one long-side portion 4a. Here, each of electric wires 3 is wound such that the turns thereof are arranged side by side in the longitudinal direction of one long-side portion 4a. Each of the electric wires 3 is wound obliquely with respect to the longitudinal direction of the long-side portion 4a. In this way, the winding portion 8 is formed.

Thus, the manufacturing of the surge voltage reducing member 1 is completed, thereby producing the surge voltage reducing member 1.

Next, comparison between the surge voltage reducing members according to one embodiment and a comparative example will be described.

The surge voltage reducing member 1 illustrated in FIG. 2A is mounted on a mounting surface (not illustrated) such that the axial-direction of the magnetic body 2 (the up-down direction in FIG. 2A) is perpendicular to the mounting surface. In the surge voltage reducing member 1, each electric wires 3 is wound around one long-side portion 4a of the magnetic body 2 such that the turns of the electric wires 3 are arranged side by side in the longitudinal direction of the long-side portion 4a, and the magnetic body 2 is positioned such that the longitudinal direction of the long-side portion 4 becomes the arrangement direction of the electric wires 3 (the direction extending through the paper sheet from the front surface to the rear surface, in FIG. 2A). Therefore, the height H1 and the width W1 can be reduced in comparison with the surge voltage reducing member 100 (Refer to FIG. 2B) according to the comparative example described later.

On the other hand, the surge voltage reducing member 100 according to the comparative example shown in FIG. 2B includes a magnetic body 101 formed in an annular shape and three electric wires 102 inserted to pass through a through hole 103 of the magnetic member 101 and wound around a body portion of the magnetic body 101. In the case of the surge voltage reducing member 100, as to the magnetic body 101 around which the three electric wires 102 are wound, when the axial-direction of the magnetic body 101 is an arrangement direction of the electric wires 102 (refer to FIG. 2B), the turns of the electric wires are arranged in the direction of passing through the paper sheet from the front surface to the rear surface of the paper sheet in FIG. 2B. Therefore, the height H2 and the width W2 of the surge voltage reducing member 100 are greatly larger than the height H1 and the width W1 of the surge voltage reducing member 1 (refer to FIG. 2A).

Next, a comparison between a case where the surge voltage reducing member 1 is provided on the conductive path for power supply from the inverter unit to the motor unit and a case where the surge voltage reducing member 1 is not provided will be described.

Here, at the time of power supply from the inverter unit to the motor unit, the rising-edge surge voltage and the falling surge voltage for the case where the surge voltage reducing member 1 is provided and the rising-edge surge voltage and the falling surge voltage for the case where the surge voltage reducing member 1 is not provided are compared, respectively. For measurement of the rising-edge surge voltage and the falling surge voltage, the motor is operated with a torque of 135 Nm and a rotation speed of 300 rpm.

As illustrated in FIGS. 3 and 4, when the surge voltage reducing member 1 is provided, a rising-edge surge voltage X1 in FIG. 4 is 535 V. On the other hand, when the surge voltage reducing member 1 is not provided, a rising-edge surge voltage X2 in FIG. 4 is 600 V. As illustrated in FIGS. 3 and 4, when the surge voltage reducing member 1 is provided, it is possible to reduce the rising-edge surge voltage by 65 V, as compared with the case where the surge voltage reducing member 1 is not provided.

As illustrated in FIGS. 5 and 6, when the surge voltage reducing member 1 is provided, the falling-edge surge voltage Y1 in FIG. 6 is −30 V. On the other hand, when the surge voltage reducing member 1 is not provided, the falling-edge surge voltage Y2 in FIG. 6 is −105 V. That is, with the surge voltage reducing member 1 provided, it is possible to reduce the falling-edge surge voltage by 75 V as compared with the case where the surge voltage reducing member 1 is not provided.

In this way, with the surge voltage reducing member 1 provided on the conductive path for supplying power from the inverter unit to the motor unit, the surge voltage can be suitably reduced.

It is assumed that the above surge voltage reducing member 1 may be replaced with the surge voltage reducing member according to a modification illustrated in FIG. 7. Hereinafter, a modification of the first embodiment will be described with reference to FIG. 7.

FIG. 7 is a plan view illustrating the surge voltage reducing member according to one modification of the first embodiment.

The surge voltage reducing member 11 illustrated in FIG. 7 is different from the first embodiment in that the surge voltage reducing member 11 includes a magnetic body 12. The magnetic body 12 is formed to have an oval shape when viewed from its axial-direction (in FIG. 7, a direction extending from the front surface to the back surface of the paper sheet), and a long-side portion 14 (14a, 14b), a short-side portion 15, and a through hole 16.

Next, the effects of the surge voltage reducing members 1 and 11 will be described. As described above with reference to FIGS. 1A to 7, the surge voltage reducing members 1 and 11 have an effect of reducing the height and width as compared with the structure of the related art in which a plurality of conductive paths are wound around an annular magnetic body, thereby having an effect of a size reduction of a product body.

Second Embodiment

In addition to the first embodiment, the surge voltage reducing member may use the following the second embodiment. Hereinafter, the second embodiment will be described with reference to FIGS. 8A and 8B.

Figure 8A:
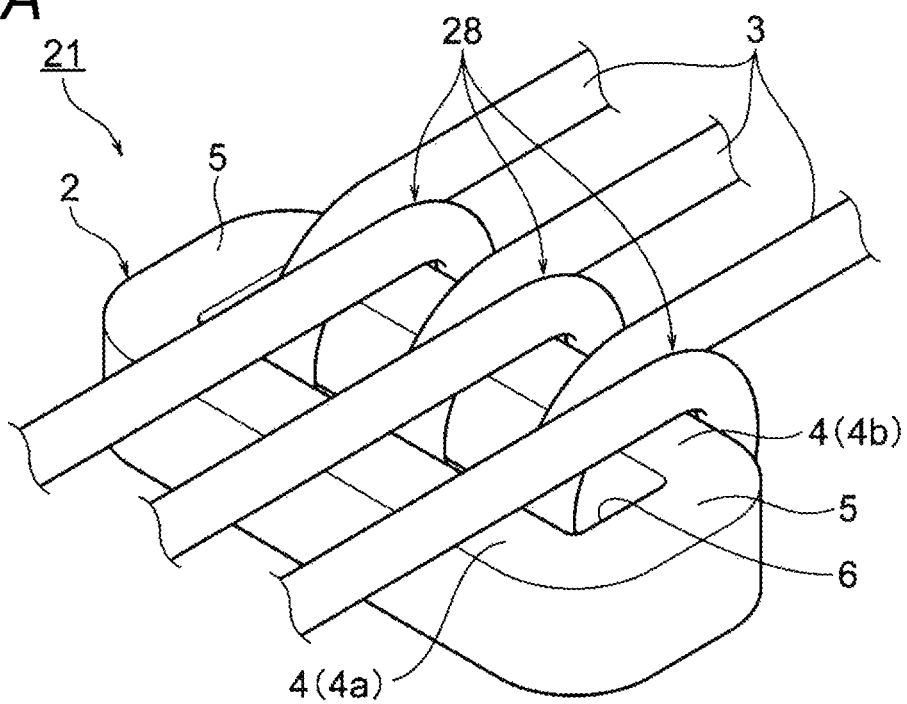
FIGS. 8A and 8B are a perspective view and a plan view, respectively, illustrating a serge voltage reducing member according to a second embodiment of the invention.
Figure 8B:
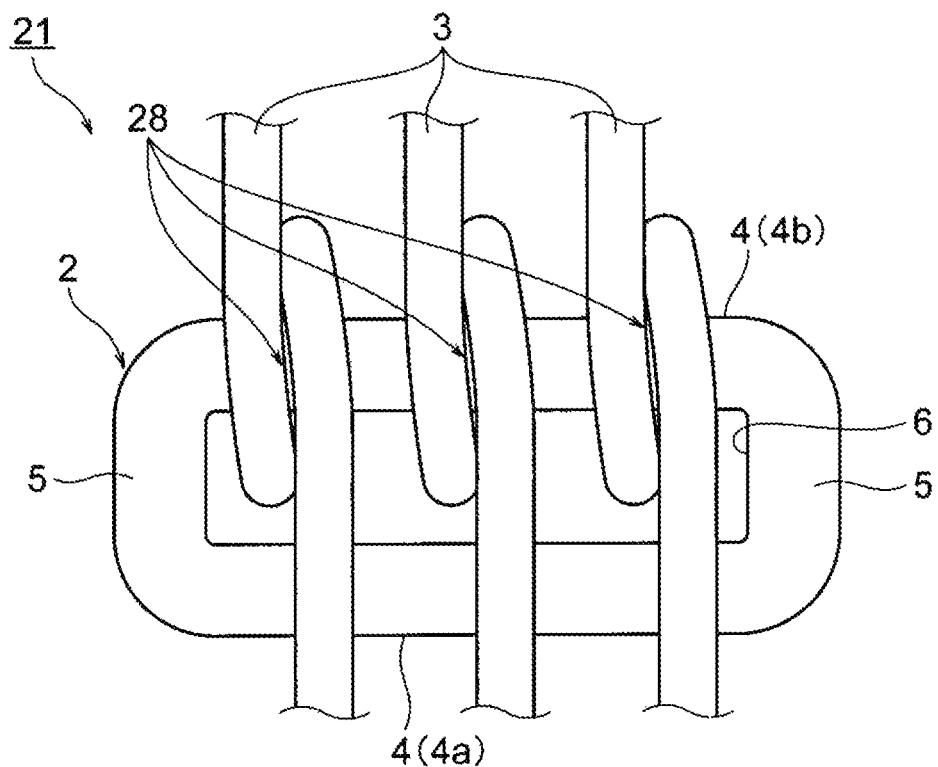

FIGS. 8A and 8B are a view illustrating the surge voltage reducing member according to the second embodiment of the invention. FIG. 8A is a perspective view of the surge voltage reducing member, and FIG. 8B is a plan view of the surge voltage reducing member. Note that the same constituent elements as those of the first embodiment are denoted by same reference numerals, and a detailed description thereof will be omitted.

The surge voltage reducing member 21 illustrated in FIGS. 8A and 8B differs from that of the first embodiment in that a winding portion 28 is formed to be perpendicular to the longitudinal direction of a long-side portion 4 of a magnetic body. Each winding portion 28 is arranged along the longitudinal direction of a second long-side portion 4b of the long-side portion 4.

Figure 9A:
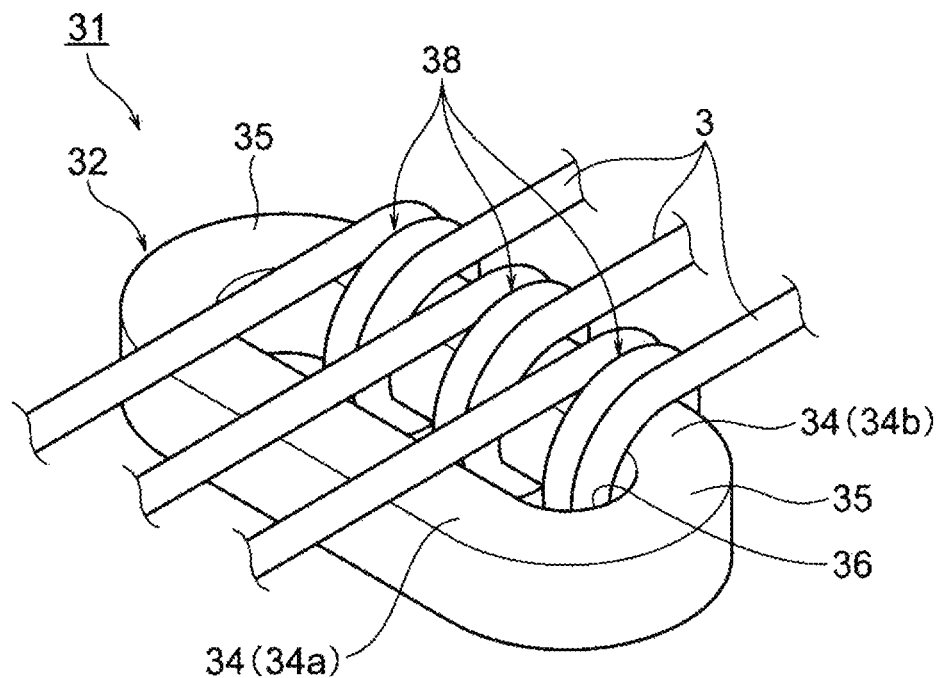
FIGS. 9A and 9B are a perspective view and a plan view, respectively, illustrating a serge voltage reducing member according to a modification to the second embodiment.
Figure 9B:
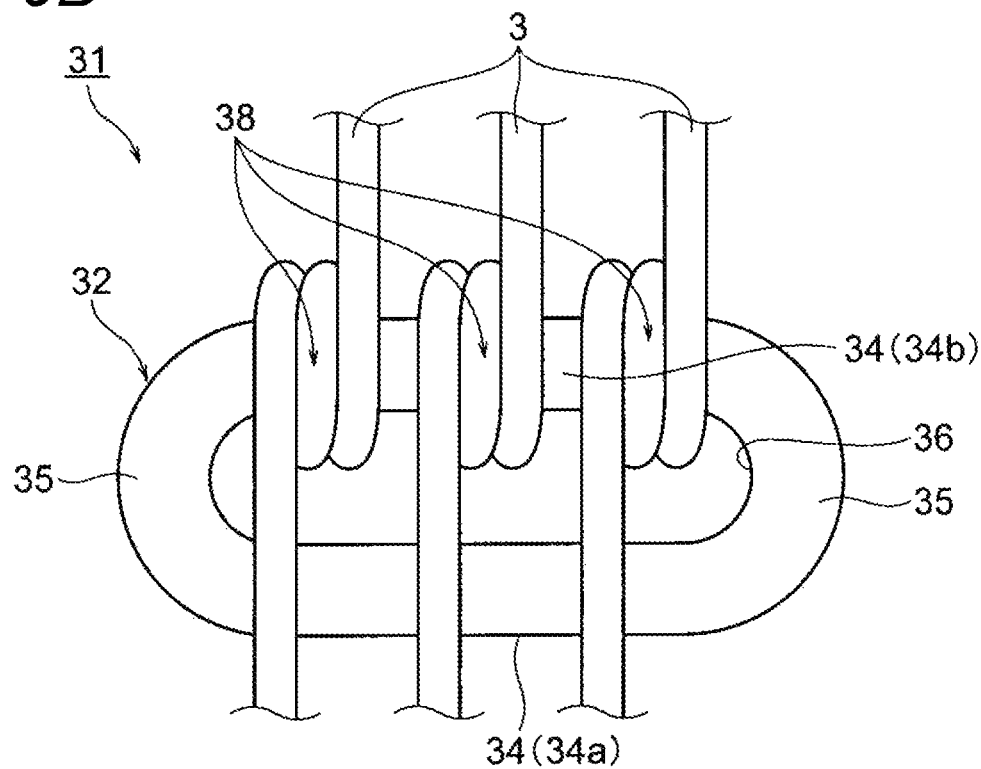

The above surge voltage reducing member 21 may be replaced by a modified example illustrated in FIGS. 9A and 9B. Hereinafter, a modification to the second embodiment will be described with reference to FIGS. 9A and 9B.

FIGS. 9A and 9B are plan views illustrating the surge voltage reducing member according to one modification of Embodiment.

The surge voltage reducing member 31 illustrated in FIGS. 9A and 9B differs from the second embodiment in that the surge voltage reducing member 31 includes a magnetic body 32. In FIG. 9B, the magnetic member 32 is formed to have an oval shape when viewed in a direction from the front surface of the paper sheet, and the magnetic member includes a long-side portion 34 (34 a, 34b), a short-side portion 35, and a through hole 36.

As illustrated in FIGS. 9A and 9B, electric wires 3 are inserted twice through the through hole 36 of the magnetic body 32 and wound around the other long-side portion (hereinafter, referred to as a second long-side portion) 34b of the magnetic body 32.

Next, effects of the surge voltage reducing members 21 and 31 will be described. As described above with reference to FIGS. 8A to 9B, the surge voltage reducing members 21 and 31 have the same effects as those of the first embodiment.

Third Embodiment

Instead of the first and the second embodiments, the surge voltage reducing member according to the third embodiment of the invention. Hereinafter, the third embodiment will be described with reference to FIGS. 10A and 10B.

Figure 10A:
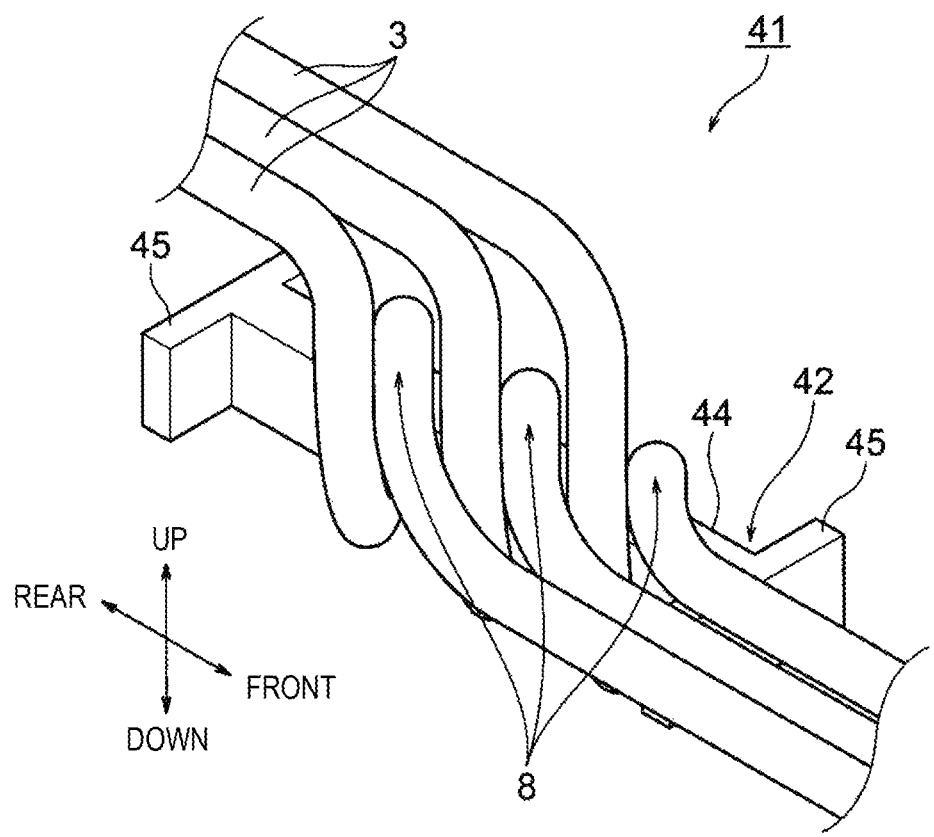
FIGS. 10A and 10B are a perspective view and a plan view, respectively, illustrating the surge voltage reducing member according to the third embodiment of the invention.
Figure 10B:
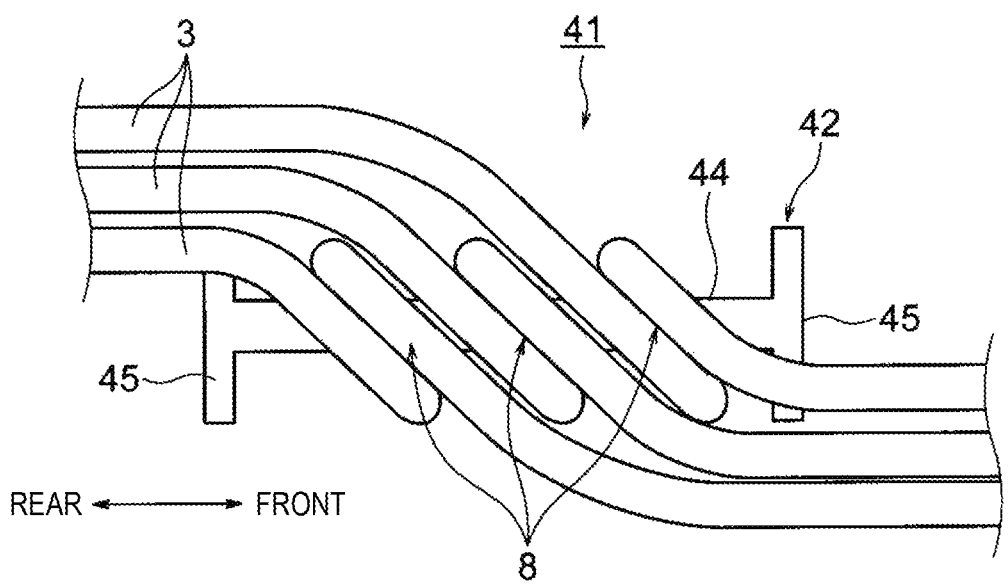

FIGS. 10A and 10B are views illustrating the surge voltage reducing member according to the third embodiment of the invention. FIG. 10A is a perspective view of the surge voltage reducing member, and FIG. 10B is a plan view of the surge voltage reducing member. It is to be noted that the arrows in the figure indicate upward and downward directions, front and rear directions (each direction of the arrow is only an example). In addition, the same reference numerals are given to the same constituent elements as those in the first embodiment, and a detailed description thereof will be omitted.

The surge voltage reducing member 41 illustrated in FIGS. 10A and 10B differs from the first embodiment and the second embodiment in that the surge voltage reducing member 41 includes a magnetic body 42. The magnetic body 42 is formed so as to have a substantially I-shape in a plan view when viewed from above and includes a long-side portion 44 and short-side portions 45 continuously extending from both longitudinal ends of the long-side portion 44.

The magnetic body 42 is arranged such that the longitudinal direction of the long-side portion 44 is the arrangement direction of the electric wires 3 (the front-rear direction in FIGS. 10A and 10B).

In the embodiment, the winding portion 8 is formed by winding the electric wire 3 obliquely with respect to the longitudinal direction of the long-side portion 44. However, the electric wire 3 may be wound in a direction perpendicular to the longitudinal direction of the long-side portion 44.

Each of electric wires 3 is wound such that the turning of the electric wires 3 are arranged side by side in the longitudinal direction of the long-side portion 44. That is, each winding portion 8 is arranged along the longitudinal direction of the long-side portion 44.

Next, the effect of the surge voltage reducing member 41 will be described. As described above with reference to FIGS. 10A and 10B, the surge voltage reducing member 41 has the same effects as those of the first embodiment and the second embodiment.

In addition, it will be understood that various modifications are possible without departing from the scope of the present invention.

The invention claimed is:

1. A surge voltage reducing member comprising:
a magnetic body including a long-side portion and short-side portions continuously formed at both ends of the long-side portion in a longitudinal direction; and
a plurality of conductive paths wound around the long-side portion,
wherein each of the conductive paths is wound in parallel with each other along the longitudinal direction of the long-side portion, and
wherein, a through hole runs through the magnetic body in an axial-direction of the magnetic body, and a width of the through hole in a short-side direction is equal to a diameter of each of the conductive paths.

2. The surge voltage reducing member according to claim 1,
wherein the magnetic body is positioned such that the longitudinal direction of the long-side portion is along an arrangement direction of the conductive paths.

3. The surge voltage reducing member according to claim 1,
wherein the short-side portion is configured to restrict movement of each of the conductive paths wound around the long-side portion in the longitudinal direction of the long-side portion.

4. The surge voltage reducing member according to claim 1,
wherein the magnetic body has a rectangular shape having the through hole.

5. The surge voltage reducing member according to claim 1,
wherein the magnetic body has an oval shape having the through hole.

6. The surge voltage reducing member according to claim 1,
wherein the plurality of conductive paths are wound obliquely with respect to the longitudinal direction of the long-side portion.

7. The surge voltage reducing member according to claim 1, wherein the plurality of conductive paths are wound in a direction perpendicular to the longitudinal direction of the long-side portion.

\* \* \* \* \*